United States Patent
Zanfei et al.

(10) Patent No.: US 10,382,330 B2
(45) Date of Patent: Aug. 13, 2019

(54) SYSTEM FOR THE ROUTING OF DATA TO COMPUTER NETWORKS

(71) Applicant: C.R.D. Centro Ricerche Ducati Trento S.r.l., Rovereto (TN) (IT)

(72) Inventors: Adriano Zanfei, Rovereto (IT); Christian Marzadro, Rovereto (IT)

(73) Assignee: C.R.D. Centro Ricerche Ducati Trento S.r.l., Rovereto (TN) (IT)

( * ) Notice: Subject to any disclaimer, the term of this patent is extended or adjusted under 35 U.S.C. 154(b) by 363 days.

(21) Appl. No.: 14/900,181

(22) PCT Filed: Jun. 16, 2014

(86) PCT No.: PCT/IB2014/062273
§ 371 (c)(1),
(2) Date: Dec. 21, 2015

(87) PCT Pub. No.: WO2014/203154
PCT Pub. Date: Dec. 24, 2014

(65) Prior Publication Data
US 2016/0149807 A1    May 26, 2016

(30) Foreign Application Priority Data

Jun. 21, 2013  (IT) .............................. MO2013A0178

(51) Int. Cl.
*H04L 12/721* (2013.01)
*H04L 12/28* (2006.01)
(Continued)

(52) U.S. Cl.
CPC .......... *H04L 45/72* (2013.01); *H04L 12/2856* (2013.01); *H04L 45/586* (2013.01);
(Continued)

(58) Field of Classification Search
CPC ... H04L 45/72; H04L 12/2856; H04L 45/586; H04L 61/2015; H04L 61/2038; H04L 61/2514; H04L 63/0272
(Continued)

(56) References Cited

U.S. PATENT DOCUMENTS 8,014,409 B1 *  9/2011  Pan ..................... H04L 45/586
                                                         370/221
9,749,291 B2 *  8/2017  Fork ..................... H04L 67/10
(Continued)

FOREIGN PATENT DOCUMENTS

WO    WO 01/82097       11/2001
WO    WO 2007/065139     6/2007
WO    WO 2014/203154    12/2014

OTHER PUBLICATIONS

International Search Report Dated Dec. 5, 2015 From the European Patent Office Re. Application No. PCT/IB2014/062273.
(Continued)

*Primary Examiner* — Chris Parry
*Assistant Examiner* — Anthony K Clayborn

(57) ABSTRACT

The system (S) for the routing of data to computer networks comprises:
- a server unit (SRV) connected to a public network (I);
- a local area network (Prop. LAN 1, . . . , Prop. LAN m) having at least a client device (CL1, . . . , CLn);
- a routing unit (FW1, . . . , FWm) having a first network interface (eth0) connected to the public network (I) directly or indirectly through a local area network of third parties (3p LAN 1, . . . , 3p LAN m) and having a second network interface (eth1) connected to the local area network (Prop. LAN 1, . . . , Prop. LAN m);
- wherein to the first network interface (eth0) is assigned a public IP address or a private IP address determined by the local area network of third parties (3p LAN 1, . . . , 3p LAN m);
- and wherein to the local area network (Prop. LAN 1, . . . , Prop. LAN m) is assigned a predefined class of private IP addresses;
- wherein routing unit (FW1, . . . , FWm) comprises automatic routing means (VM0) of data between the server unit (SRV) and the local area network (Prop. LAN 1, . . . , Prop. LAN m) independently of the IP address assigned to the first network interface (eth0).

5 Claims, 6 Drawing Sheets

(51) Int. Cl.
*H04L 12/713* (2013.01)
*H04L 29/12* (2006.01)
*H04L 29/06* (2006.01)

(52) U.S. Cl.
CPC ...... *H04L 61/2015* (2013.01); *H04L 61/2038* (2013.01); *H04L 61/2514* (2013.01); *H04L 63/0272* (2013.01)

(58) Field of Classification Search
USPC .......................................................... 709/238
See application file for complete search history.

(56) References Cited

U.S. PATENT DOCUMENTS

| | | | | |
|---|---|---|---|---|
| 2002/0016926 | A1* | 2/2002 | Nguyen | H04L 29/12018 726/12 |
| 2004/0015966 | A1* | 1/2004 | MacChiano | H04L 67/00 718/1 |
| 2006/0168321 | A1* | 7/2006 | Eisenberg | H04L 29/06 709/238 |
| 2007/0061887 | A1* | 3/2007 | Hoover | G06F 21/6218 726/26 |
| 2007/0130366 | A1* | 6/2007 | O'Connell | H04L 12/4633 709/238 |
| 2008/0034110 | A1* | 2/2008 | Suganthi | H04L 63/0272 709/238 |
| 2009/0157901 | A1* | 6/2009 | Asati | H04L 29/12386 709/238 |
| 2009/0248896 | A1* | 10/2009 | Cohn | H04L 29/12028 709/245 |
| 2011/0153793 | A1* | 6/2011 | Tan | H04L 63/0272 709/222 |
| 2011/0202609 | A1* | 8/2011 | Chaturvedi | H04L 29/125 709/206 |
| 2012/0182992 | A1* | 7/2012 | Cowart | H04L 45/22 370/392 |
| 2013/0205040 | A1* | 8/2013 | Naor | H04L 61/256 709/238 |
| 2016/0149807 | A1* | 5/2016 | Zanfei | H04L 12/2856 709/238 |

OTHER PUBLICATIONS

Rapporto di Ricerca e Opinione Scritta [Search Report and Written Opinion] Dated Apr. 10, 2014 From the Ministero Dello Sviluppo Economico, Direzione Generale Sviluppo Produttivo e Competitivo, Ufficio Italiano Brevetti e Marchi Re. Application No. ITMO20130178.
Marques et al. "BGP-Signaled End-System IP/VPNs. Draft-Ietr-l3vpn-End-System-01", Internet Engineering Task Force, IETF Standard Working Draft, Network Working Group, XP015091685, p. 1-42, Apr. 2013.

* cited by examiner

| Destination | Gateway | Genmask | Flags | Metric | Ref | Use | Iface | MSS | Window | irtt |
|---|---|---|---|---|---|---|---|---|---|---|
| 0.0.0.0 | 192.168.247.254 | 0.0.0.0 | UG | 0 | 0 | 0 | eth0 | 0 | 0 | 0 |
| 172.17.200.0 | 0.0.0.0 | 255.255.255.0 | U | 0 | 0 | 0 | eth1 | 0 | 0 | 0 |
| 192.168.247.0 | 0.0.0.0 | 255.255.255.0 | U | 0 | 0 | 0 | eth0 | 0 | 0 | 0 |

Fig. 9

| Destination | Gateway | Genmask | Flags | Metric | Ref | Use | Iface | MSS | Window | irtt |
|---|---|---|---|---|---|---|---|---|---|---|
| 0.0.0.0 | 172.17.200.254 | 0.0.0.0 | UG | 0 | 0 | 0 | br1 | 0 | 0 | 0 |
| 10.0.0.0 | 172.18.0.1 | 255.0.0.0 | UG | 0 | 0 | 0 | tun1 | 0 | 0 | 0 |
| 172.17.200.0 | 0.0.0.0 | 255.255.255.0 | U | 0 | 0 | 0 | br1 | 0 | 0 | 0 |
| 172.18.0.1 | 0.0.0.0 | 255.255.255.255 | UH | 0 | 0 | 0 | tun1 | 0 | 0 | 0 |
| 192.168.2.0 | 0.0.0.0 | 255.255.255.0 | U | 0 | 0 | 0 | eth1.2 | 0 | 0 | 0 |
| 192.168.3.0 | 0.0.0.0 | 255.255.255.0 | U | 0 | 0 | 0 | eth1.3 | 0 | 0 | 0 |
| 192.168.4.0 | 0.0.0.0 | 255.255.255.0 | U | 0 | 0 | 0 | eth1.4 | 0 | 0 | 0 |
| 192.168.5.0 | 0.0.0.0 | 255.255.255.0 | U | 0 | 0 | 0 | eth1.5 | 0 | 0 | 0 |
| 192.168.6.0 | 0.0.0.0 | 255.255.255.0 | U | 0 | 0 | 0 | eth1.6 | 0 | 0 | 0 |
| 192.168.10.0 | 0.0.0.0 | 255.255.255.0 | U | 0 | 0 | 0 | eth1.1 | 0 | 0 | 0 |

Fig. 10

SYSTEM FOR THE ROUTING OF DATA TO COMPUTER NETWORKS

RELATED APPLICATIONS

This application is a National Phase of PCT Patent Application No. PCT/IB2014/062273 having International filing date of Jun. 16, 2014, which claims the benefit of priority of Italian Patent Application No. MO2013A000178 filed on Jun. 21, 2013. The contents of the above applications are all incorporated by reference as if fully set forth herein in their entirety.

FIELD AND BACKGROUND OF THE INVENTION

The present invention relates to a system for the routing of data to computer networks.

The increasingly stronger need exists to connect an application on a client computer to an application on a remote server through the conventional Internet.

Generally, the connection has a series of common features:
- the traffic generated by the two applications uses standard level-4 protocols of the so-called ISO/OSI model, typically TCP (Transmission Control Protocol) or UDP (User Datagram Protocol) protocols;
- to each application (or service) is statically associated a different port (socket), which enables several processes/applications to activate multiple TCP/UDP connections despite sharing the same IP address;
- access to the Internet by components or apparatus is of the indirect type.

This implies that the assigned IP address is not public, but rather belongs to a sub-network to which the apparatus is connected and is therefore a private and not univocal address in the space of addresses assigned in the Internet.

Within the sub-network, the use is known and common of an electronic component/apparatus, a so-called router suitable for routing data towards distinct networks and, in particular, suitable for managing all the requests towards public IP addresses.

Within the networks, also managed is the filtering of communications according to the IP address, to the TCP/UDP port number, besides the plaintext of the communication.

The filtering done by the firewall can be more or less stringent depending on the level of computer security envisaged for the specific sub-network.

Considering the need to connect an application p on a client computer to an application present on a remote server through the conventional Internet, and in general the need to interconnect different client apparatus/components, a number of complexities are therefore to be found.

The client apparatus/components can in fact have the following characteristics:
- private IP address and therefore not univocal;
- the requests towards public IPs are routed by a third-party gateway present on the same network;
- the third-party firewall may not allow routing packages tied to a number of ports and/or effecting filtering according to the contents of the packages;
- the third-party firewall may not send the requests coming from outside towards a client present in its sub-network.

To overcome such drawbacks and allow the complete control of the client, communication systems of the VPN (Virtual Private Network) type are normally used, which make it possible to establish a private connection between two apparatuses, more specifically between client and server, using a shared public network.

In particular, a number of VPN programs, such as, e.g., OpenVPN, permit implementing tunnelling, i.e., the channelling of all the TCP/UDP connections on different ports routed onto a single port, e.g., the more common 80 TCP/IP port, thus in fact resolving the problem of filtering effected by a third-party firewall and the routing of the packages from and to the client.

As FIG. 1 schematically shows, the use of a VPN type system envisages the assigning on the server of an IP address for one end of the tunnels (srvtun1) and the assigning of a different IP address on each client for every other end of the tunnels (tun1-tunn).

As shown in FIG. 1, always by way of example, in this configuration, the possibility exists that the network interface (eth0) of the client (client 1) connected to a LAN (3p LAN 1) be assigned an IP address identical to that preset for the tunnel (tun1), with consequent forwarding problems.

In fact, in such case, the private IP address assigned to the network interface (eth0) is assigned dynamically by the DHCP service of the private network (3p LAN 1) and can belong to any class of private IP addresses.

In particular, the three classes of private IP addresses are, respectively:
- class A 10.x.x.x addresses, with IP addresses from 10.0.0.0 to 10.255.255.255;
- class B 172.x.x.x addresses, with IP addresses from 172.16.0.0 to 172.31.255.255;
- class C 192.168.x.x addresses, with IP addresses from 192.168.0.0 to 192.168.255.255.

To overcome such drawback, the intervention is therefore required of the network administrator who, after checking the fault, must change the assigned IP addresses in a manual and static way.

SUMMARY OF THE INVENTION

The main aim of the present invention is to provide a system for the routing of data to computer networks which ensures the correct routing of the data between devices belonging to different sub-networks, connected to the Internet both directly and indirectly, in a fully automatic way and without the need for the manual configuration of the routed data.

Another object of the present invention is to provide a system for the routing of data to computer networks that allows to overcome the mentioned drawbacks of the prior art in the ambit of a simple, rational, easy and effective to use as well as low cost solution.

The above mentioned objects are achieved by the present system for the routing of data to computer networks according to claim 1.

BRIEF DESCRIPTION OF THE DRAWINGS

Other characteristics and advantages of the present invention will become more evident from the description of a preferred, but not exclusive, embodiment of a system for the routing of data to computer networks, illustrated by way of an indicative, but not limitative example in the accompanying drawings in which:

FIG. 9 shows a possible first virtual routing table implementable within the routing unit of FIG. 8;

FIG. 10 shows a possible second routing table implementable within the routing unit of FIG. 8.

DESCRIPTION OF SPECIFIC EMBODIMENTS OF THE INVENTION

With particular reference to such illustrations, by S a system has been globally indicated for the routing of data to computer networks, able to allow the automatic interlinking of different client devices or components connected to different private proprietary networks directly or indirectly connected to the Internet by means of networks of third parties.

Figure 1:
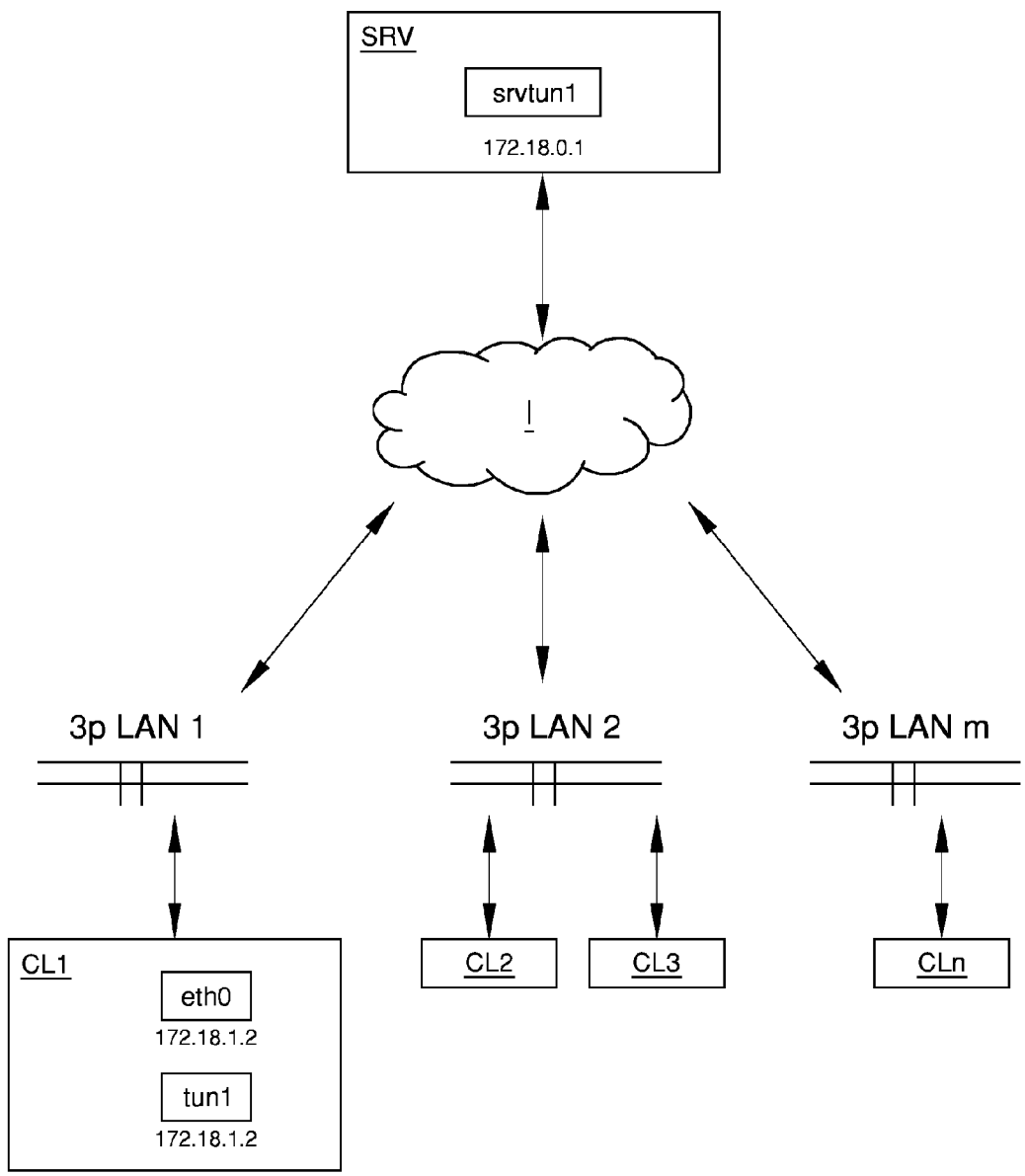
FIG. 1 is a block diagram showing a VPN system of known type.
Figure 2:
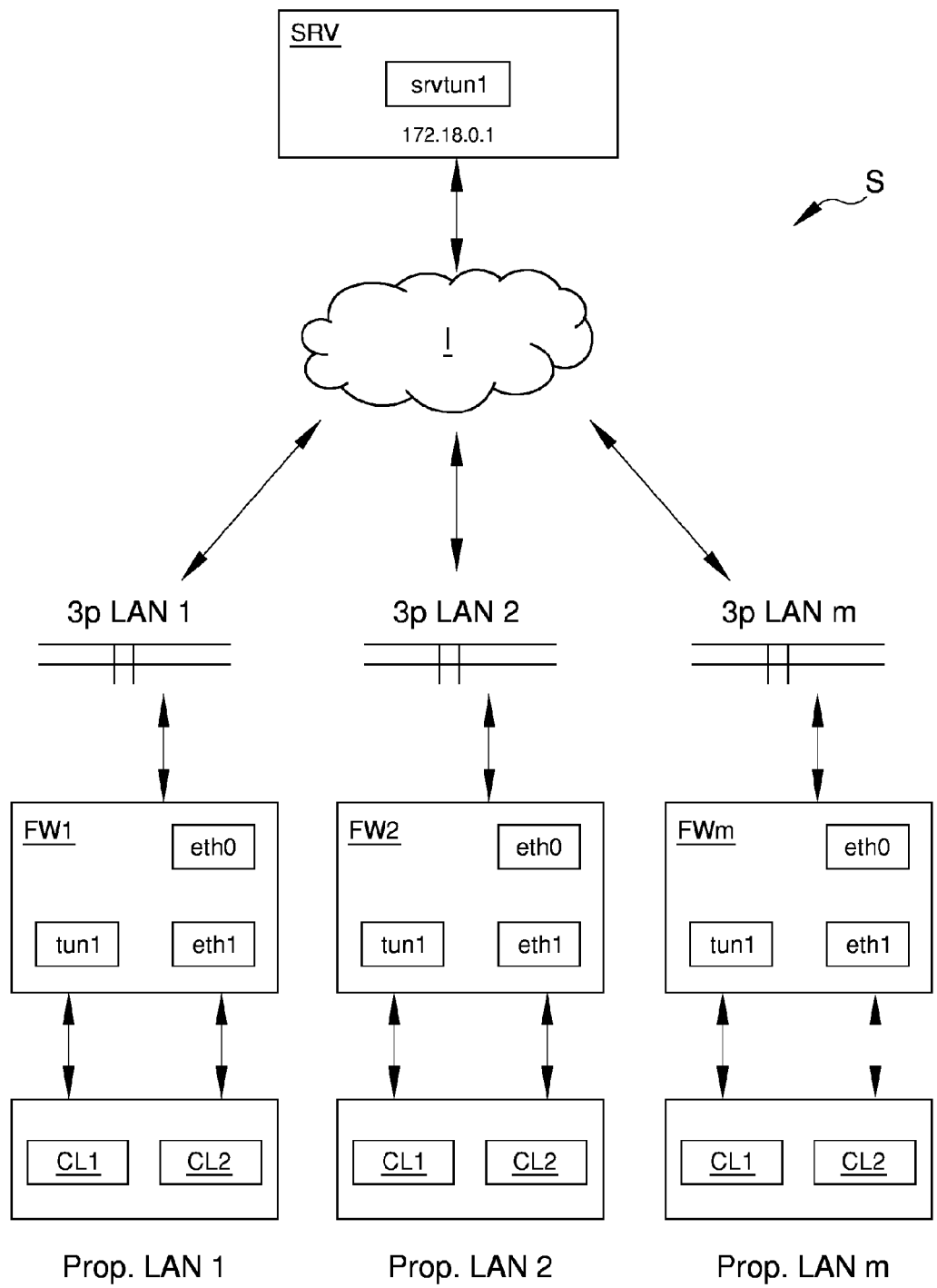
FIG. 2 is a bloc diagram showing the system according to the invention as a whole.
Figure 3:
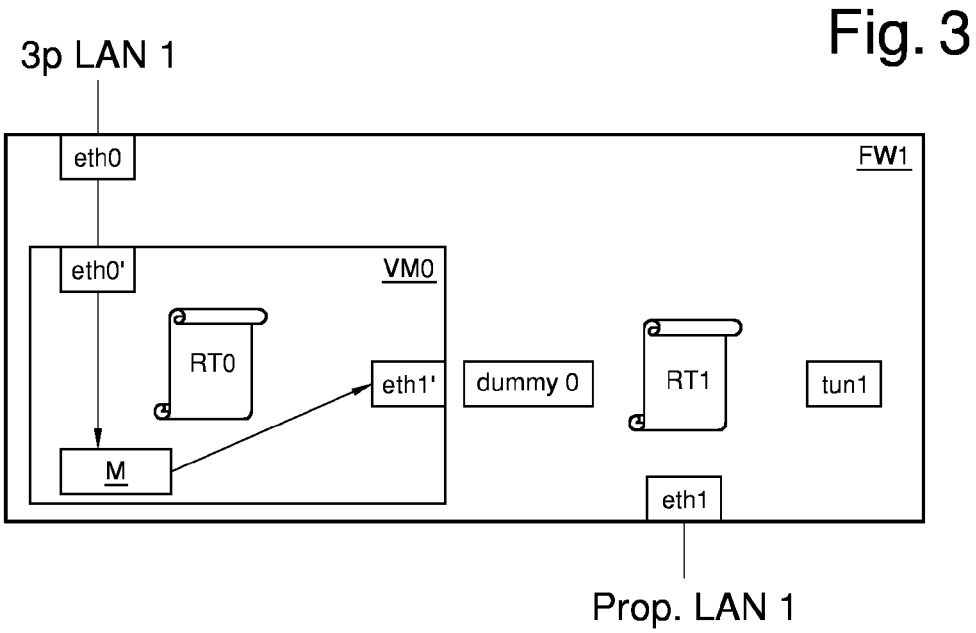
FIG. 3 is a bloc diagram showing in greater detail a routing unit, of the type of a firewall/router, belonging to the system according to the invention.

In particular, as schematically shown in FIG. 2, the system S comprises:
- a server unit SRV connected to a public network I, consisting e.g. of the conventional Internet;
- a plurality of proprietary local area networks, indicated by the wording Prop. LAN 1, . . . , Prop. LAN m, having respective client devices CL1, . . . , CLn;
- a plurality of routing units FW1, . . . , FWm, consisting of suitable components and/or devices, connected to respective proprietary local area networks and connected to the public network I through respective local area networks of third parties 3p LAN 1, . . . , 3p LAN m.

Different architectures of the system S cannot however be ruled out wherein, e.g., some or all the routing units FW1, . . . , FWm are directly connected to the public network I.

The local area networks of third parties 3p LAN 1, . . . , 3p LAN m can consist, e.g., of respective WANs (Wide Area Networks) extending inside a determinate geographic area, e.g., inside different municipality areas.

The routing units FW1, . . . , FWm consist of respective proprietary firewalls/routers and are crucial for the management of each of the proprietary local area networks.

In particular, each of the routing units FW1, . . . , FWm has a first network interface eth0 connected to the public network I through a respective local area network of third parties 3p LAN 1, . . . , 3p LAN m.

Furthermore, each of the routing units FW1, . . . , FWm has a second network interface eth1 connected to a respective local area network Prop. LAN 1, . . . , Prop. LAN m.

Usefully, each of the routing units FW1, . . . , FWm has a third network interface connected to the server unit SRV through a private connection VPN (Virtual Private Network).

Such private connection VPN is preferably made by means of Open VPN or other tunnelling solution on an identified port free to communicate on networks of third parties.

Each routing unit FW1, . . . , FWm (firewall/router) is able to manage:
- a private IP address not previously known on the first network interface eth0, which can belong to any class of private IP addresses and which, e.g., can be assigned dynamically by a service DHCP of the respective local area network of third parties;
- the IP routing of client devices CL1, . . . , CLn belonging to proprietary local area networks connected to the second network interface eth1;
- one or more IP addresses relating to one or more third network interfaces tun1 dedicated to the tunnels VPN;
- the routing of other client devices CL1 . . . , CLn belonging to other proprietary local area networks.

Advantageously, each routing unit FW1, . . . , FWm comprises automatic routing means VM0, consisting of a suitable component or device, suitable for routing the data between the server unit SRV and the respective local area network Prop. LAN 1, . . . , Prop. LAN m, independently of the IP address assigned to the respective first network interface eth0.

This way, each routing unit FW1, . . . , FWm ensures the correct routing of the data between client devices belonging to different local area networks, connected to the Internet either directly or indirectly, in a completely automatic way and without the need for manual configurations of the routing information.

With reference to a preferred embodiment, the automatic routing means VM0 are implemented by means of a virtual machine operatively placed between the first network interface eth0 and the second network interface eth1.

In particular, the virtual machine VM0 consists of a software made specifically for data forwarding/routing.

Different embodiments cannot however be ruled out wherein, e.g., the automatic routing means are implemented by means of one or more hardware devices and/or software programs distinct and separate with respect to the firewall/router.

In particular, each virtual machine VM0 comprises at least a first virtual network interface eth0' connected to the first network interface eth0.

Moreover, each routing unit FW1, . . . , FWm comprises a dummy network interface dummy0 and each virtual machine VM0 comprises a second virtual network interface eth1' connected to such dummy network interface dummy0.

Each virtual machine VM0 comprises a virtual routing table RT0 containing information on the forwarding of data towards the first and the second virtual network interface eth0' and eth1'.

Moreover, each routing unit FW1, . . . , FWm comprises a routing table RT1 containing information on the forwarding of data towards the second network interface eth1, the third network interface tun1 and the dummy network interface dummy0.

Advantageously, the IP address of said first virtual network interface eth0' corresponds to the IP address of the first network interface eth0.

Moreover, the virtual machine VM0 comprises determination means M suitable for determining an IP address to be assigned to the second virtual network interface eth1' according to the IP address of the first virtual network interface.

Preferably, the determination means are implemented by means of a suitable software algorithm.

In particular, the IP address of the second virtual network interface eth1':
- belongs to a different class of IP addresses than the class of IP addresses of the IP address of the first virtual network interface eth0';
- does not coincide with any of the IP addresses assignable to the respective local area network Prop. LAN 1, . . . , Prop. LAN m.

Furthermore, the software algorithm M is suitable for determining an IP address to be assigned to the dummy network interface dummy0 according to the IP address of the first virtual network interface eth0'.

In particular, the IP address of the dummy network interface dummy0:
- belongs to a different class of IP address than the IP address class of the first virtual network interface eth0';
- does not coincide with any of the IP addresses assignable to said local area network.

Preferably, the software algorithm M programs a server DHCP to assign the determined IP address to the dummy network port dummy0.

With reference to a preferred embodiment of the system S, a specific and predefined class of IP addresses is used for the routing of all the local area networks Prop. LAN 1, . . . , Prop. LAN m.

For example, the IP addresses of class C from 192.168.x.0 to 192.168.x.255 can be used for each proprietary local area network.

Always with reference to a preferred embodiment of the system S, a specific and predefined class of IP addresses is used for the routing of the tunnels VPN by means of the third network interfaces tun1.

For example, the IP addresses of class B from 172.16.0.0 to 172.31.255.255 can be used for each interface of the tunnels VPN.

During the operation of system S, each routing unit FW1, . . . , FWm is able to manage any dynamic IP assignment on the first network interface eth0 connected to the local area network of third parties.

The FIGS. 4, 5, 6 and 7 schematically show different possible forwarding that can be made by means of each routing unit FW1, . . . , FWm.

Figure 4:
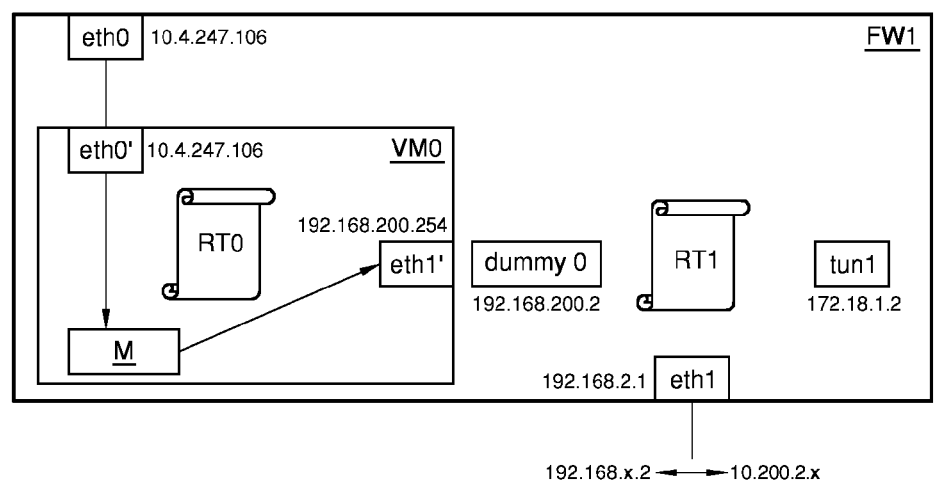
FIGS. 4, 5, 6 and 7 schematically show different possible forwarding which can be made through the routing unit of FIG. 2.

In the example in FIG. 4 to the first network interface eth0 is assigned a class A address 10.4.247.106.

The first virtual network interface eth0' of the virtual machine VM0 in the routing unit FW1 takes the same address as eth0, therefore the class A address 10.4.247.106. The software algorithm M implemented in the virtual machine VM0 assigns the class C address C 192.169.200.254 to the second virtual network interface eth1' and programs a server DHCP to assign the class C address 192.169.200.2 to the dummy network interface dummy0 of the routing unit FW1.

To the third network interface tun1, intended for communication by tunnel VPN, remains assigned a class B address, e.g., 172.18.1.2.

To the second network interface eth1, connected to the proprietary local area network, remains assigned a class C address, e.g., 192.168.2.1.

In particular, the second network interface eth1 can dynamically and statically manage all the space of class C addresses, from 192.168.0.0 to 192.168.255.255, except for the addresses 192.168.200.254 and 192.168.200.2 dedicated to the interfaces eth1' and dummy0, thus making it possible to route all the clients of the proprietary local area network.

Figure 5:
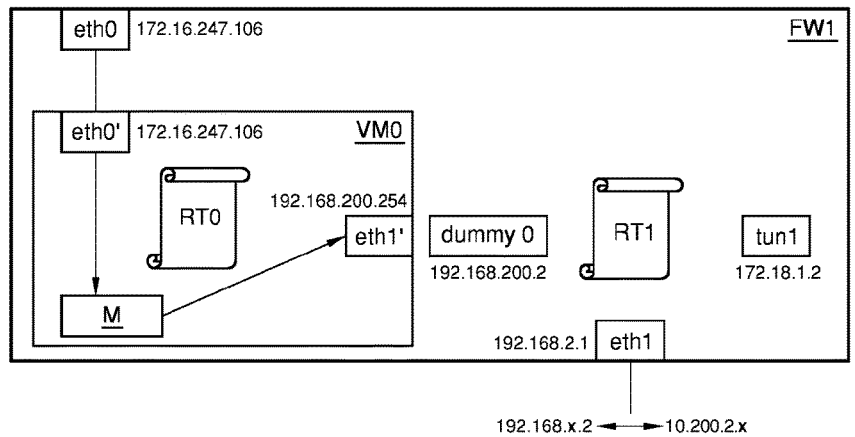

In the example in FIG. 5 to the first network interface eth0 is assigned a class B address 172.16.247.106.

The first virtual network interface eth0' of the virtual machine VM0 in the routing unit FW1 takes the same address as eth0, therefore the class B address 172.16.247.106.

The software algorithm M implemented in the virtual machine VM0 assigns the class C address 192.169.200.254 to the second virtual network interface eth1' and programs a server DHCP to assign the class C address 192.169.200.2 to the dummy network interface dummy0 of the routing unit FW1.

To the third network interface tun1, intended for communication by tunnel VPN, remains assigned a class B address, e.g., 172.18.1.2.

To the second network interface eth1, connected to the proprietary local area network, remains assigned a class C address, e.g., 192.168.2.1.

In particular, the second network interface eth1 can dynamically and statically manage all the space of class C addresses, from 192.168.0.0 to 192.168.255.255, except for the addresses 192.168.200.254 and 192.168.200.2 dedicated to the interfaces eth1' and dummy0, thus making it possible to route all the clients of the proprietary local area network.

Figure 6:
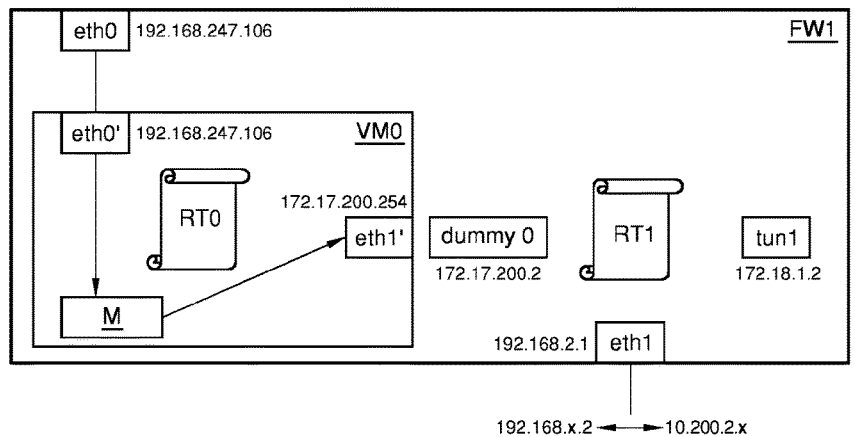

In the example in FIG. 6, to the first network interface eth0 is assigned a class C address 192.168.247.106.

The first virtual network interface eth0' of the virtual machine VM0 in the routing unit FW1 takes the same address as eth0, therefore the class C address 192.168.247.106.

The software algorithm M implemented in the virtual machine VM0 assigns the class B address 172.17.200.254 to the second virtual network interface eth1' and programs a server DHCP to assign the class C address 172.17.200.2 to the dummy network interface dummy0 of the routing unit FW1.

To the third network interface tun1, dedicated to communication by means of tunnel VPN remains assigned a class B address, e.g. 172.18.1.2.

To the second network interface eth1, connected to the proprietary local area network remains assigned a class C address, e.g., 192.168.2.1.

In particular, the second network interface eth1 can dynamically and statically manage all the space of class C addresses, from 192.168.0.0 to 192.168.255.255, thus making it possible to route all the clients of the proprietary local area network.

Figure 7:
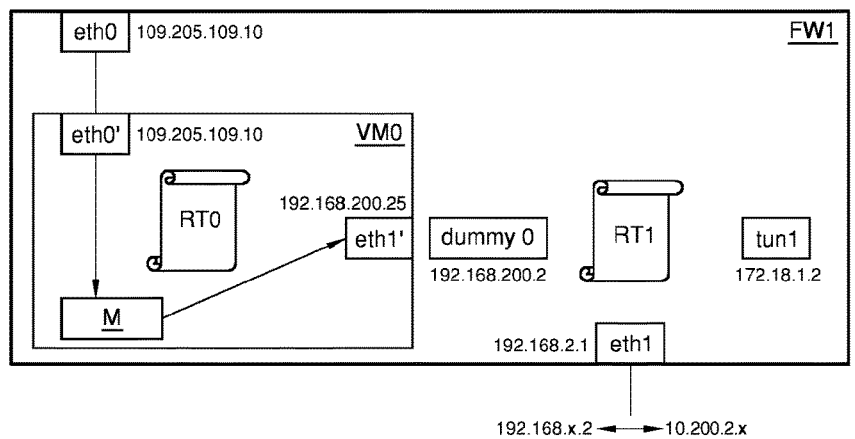

In the example in FIG. 7 to the first network interface eth0 is assigned a public address 109.205.109.10.

The first virtual network interface eth0' of the virtual machine VM0 in the routing unit FW1 takes the same address as eth0, therefore the public address 109.205.109.10.

The software algorithm M implemented in the virtual machine VM0 assigns the class C address 192.169.200.254 to the second virtual network interface eth1' and programs a server DHCP to assign the class C address 192.169.200.2 to the dummy network interface dummy0 of the routing unit FW1.

To the third network interface tun1, dedicated to communication by means of tunnel VPN remains assigned a class B address, for example 172.18.1.2.

To the second network interface eth1, connected to the proprietary local area network remains assigned a class C address, e.g., 192.168.2.1.

In particular, the second network interface eth1 can dynamically and statically manage all the space of class C addresses, from 192.168.0.0 to 192.168.255.255, except for the addresses 192.168.200.254 and 192.168.200.2 dedicated to the eth1' and dummy0 interfaces, thus making it possible to route all the clients of the proprietary local area network.

In practice, in each of the examples described above, the class C addresses always remain free and usable for the proprietary local area networks Prop. LAN 1, . . . , Prop. LAN m.

To allow the connection of two client units of two different proprietary local area networks through the tunnels VPN, each of the routing units FW1, ..., FWm comprise mapping means, implemented by means of one or more network mapping rules stored inside the routing unit itself, suitable for associating the class A addresses with the other proprietary local area networks.

As is known, the class A addresses go from 10.x.x.x to 10.255.255.255 and, therefore, this allows having at disposal 256*256*256 addresses.

Preferably, the second and the third available fields of each IP address of class A are intended to identify the routing units FW1, ..., FWm, while the third available field is intended to identify each client unit CL1, ..., CLn inside the specific proprietary local area network Prop. LAN 1, ..., Prop. LAN m.

In particular, according to a preferred but not exclusive embodiment of the system S, the aforementioned mapping rules associate the class C addresses associated with each client unit CL1, ..., CLn inside a proprietary local area network with the class A addresses in the following way:

192.168.x.2 corresponds to 10.<firewall field number 1>.<firewall field number 2>.x.

For example:
192.168.1.2 corresponds to 10.200.2.1;
192.168.2.2 corresponds to 10.200.2.2;
192.168.3.2 corresponds to 10.200.2.3;
192.168.4.2 corresponds to 10.200.2.4;
192.168.5.2 corresponds to 10.200.2.5.

Figure 8:
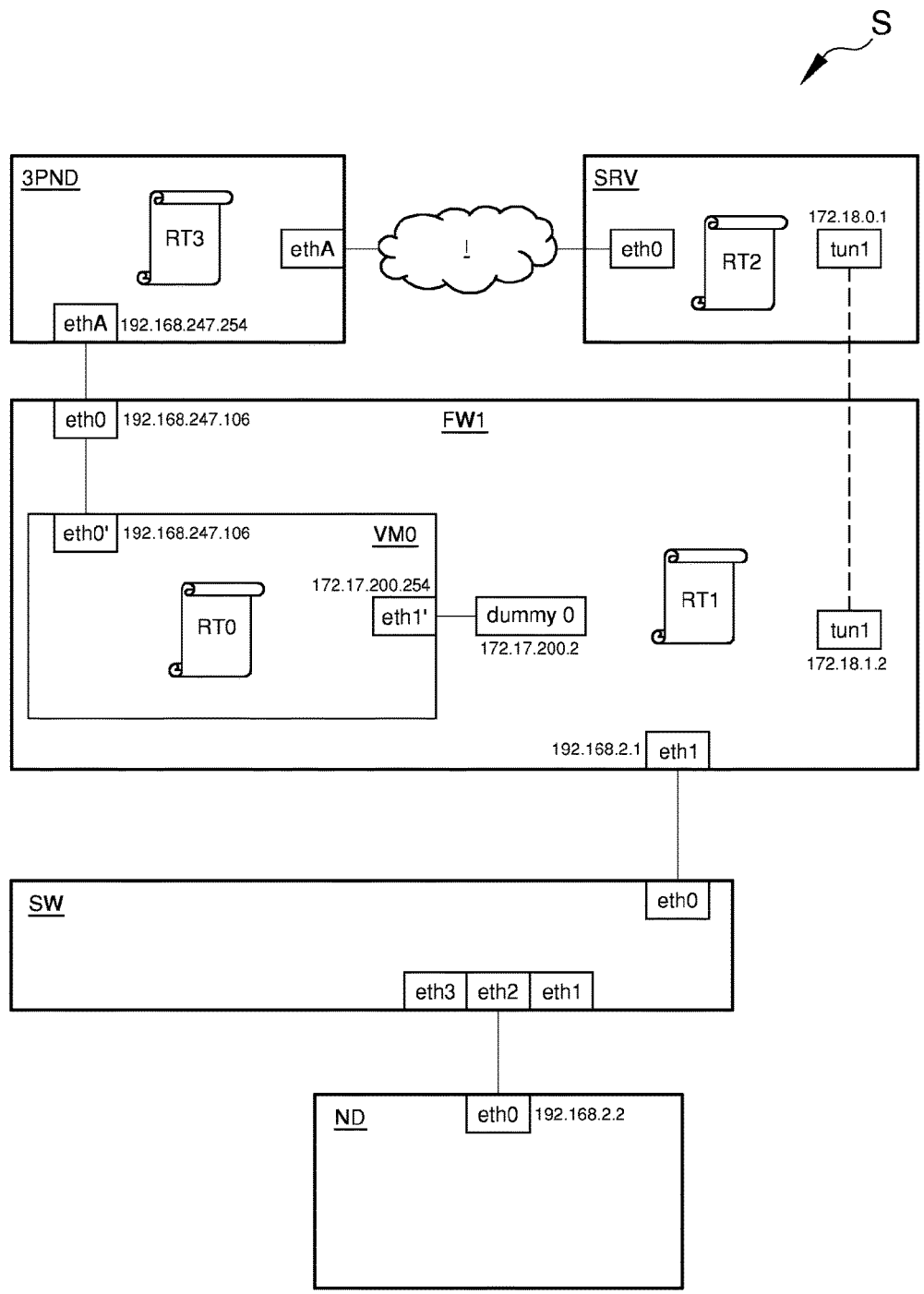
FIG. 8 shows a second possible embodiment of the system according to the invention.

With particular reference to an alternative embodiment of the system S schematically shown by way of example in FIG. 8, the use is envisaged of VLAN (Virtual LAN) networks connected to one or more network switches SW.

Such particular embodiment permits safely managing the connection between the client unit of the same proprietary local area network, forcing their communication towards the firewall FW.

Furthermore, a univocal association is defined between each port number of the network switch SW and the IP address assigned to such port.

In particular, each IP address of the 192.168.x.2 type corresponds to the apparatus connected to the port x.

For example:
192.168.1.2 corresponds to the apparatus connected to port 1;
192.168.2.2 corresponds to the apparatus connected to port 2;
192.168.3.2 corresponds to the apparatus connected to port 3;
192.168.4.2 corresponds to the apparatus connected to port 4;
192.168.5.2 corresponds to the apparatus connected to port 5.

Furthermore, by way of example only, the FIGS. 9 and 10 show possible routing tables of the system S.

In particular, FIG. 9 shows possible routing information stored inside a virtual routing table RT0 of a virtual machine VM0 of the system S.

FIG. 10 on the other hand shows possible routing information stored inside a routing table RT1 of a routing unit FW1, ... FWm of the system S.

It has in fact been ascertained how the described invention achieves the proposed objects.

What is claimed is:

1. System (S) for the routing of data to computer networks, comprising:
at least a server unit (SRV) connected to a public network (I);
at least one of a plurality of local area networks (Prop. LAN 1, ..., Prop. LAN m) each having at least a client device (CL1, ..., CLn);
at least a routing unit (FW1, ..., FWm) having a first network interface (eth0) connected to said public network (I) directly or indirectly through a local area network of third parties (3p LAN 1, ..., 3p LAN m) and having at least a second network interface (eth1) connected to said local area network (Prop. LAN 1, ..., Prop. LAN m);
wherein to said first network interface is assigned a public IP address or a private IP address determined by said local area network of third parties (3p LAN 1, ..., 3p LAN m),
and wherein to said local area network (Prop. LAN 1, ..., Prop. LAN m) is assigned at least a predefined class of private IP addresses;
wherein said routing unit (FW1, ..., FWm) routes data between said at least one server unit (SRV) and said at least one local area network (Prop. LAN 1, ..., Prop. LAN m) independently of the IP address assigned to said first network interface (eth0);
wherein said routing unit comprises at least a virtual machine (VM0) operatively placed between said first network interface (eth0) and said second network interface (eth1);
wherein said virtual machine (VM0) comprises at least a first virtual network interface (eth0') connected to said first network interface (eth0);
wherein said routing unit (FW1, ..., FWm) comprises at least a dummy network interface (dummy0) assigned with an IP address for routing data between at least one of: said at least one server unit (SRV) and said at least one local area network (Prop. LAN 1, ..., Prop. LAN m) and at least two client units (CL1, ..., CLn); of at least two different proprietary local area networks from said plurality of local area networks;
wherein said virtual machine (VM0) comprises at least a second virtual network interface (eth1') connected to said dummy network interface (dummy0);
wherein said virtual machine (VM0) comprises a software algorithm for:
1) automatically determining an IP address to be assigned to said second virtual network interface (eth1') according to said IP address of the first virtual network interface (eth0'), and
2) automatically determining the IP address assigned to a respective said dummy network interface (dummy0) according to said IP address of the first virtual network interface (eth0'), so that:
said IP address of the second virtual network interface (eth1') belongs to a class of IP addresses different to the class of IP addresses of said IP address of the first virtual network interface (eth0'),
said IP address of the second virtual network interface (eth1') does not coincide with any of the IP addresses assignable to said local area network (Prop. LAN 1, ..., Prop. LAN m).

2. System (S) according to claim 1, wherein said routing unit (FW1, ..., FWm) comprises at least a third network interface (tun1) connected to said server unit (SRV) through at least a VPN connection.

3. System (5) according to claim 1, wherein said virtual machine (VM0) comprises at least a virtual routing table (RT0) containing information on the forwarding of data to said first and second virtual network interfaces (eth0', eth1').

4. System (5) according to claim 1, wherein the IP address of said first virtual network interface (eth0') corresponds to said IP address of the first network interface (eth0).

5. System (S) according to claim 1, wherein said routing unit (FW1, . . . , FWm) comprises:
- at least a third network interface (tun1) connected to said server unit (SRV) through at least a VPN connection; and
- at least a routing table (RT1) containing information on the forwarding of data to said second network interface (eth1), said third network interface (tun1) and said dummy network interface (dummy0).

* * * * *